United States Patent

[11] 3,539,110

[72] Inventor Torao Kobayashi
 Tokyo, Japan
[21] Appl. No. 757,283
[22] Filed Sept. 4, 1968
[45] Patented Nov. 10, 1970
[73] Assignee Kyoritsu Noki Co., Ltd.
 Tokyo, Japan
 a corporation of Japan
[32] Priority Sept. 8, 1967; Oct. 3, 1967
[33] Japan
[31] 42/57,293; (utility model)42/83,747

[54] MIST SPRAYER
 3 Claims, 10 Drawing Figs.
[52] U.S. Cl. ........................... 239/223,
 239/152, 239/154, 239/355, 239/379, 239/423,
 239/433
[51] Int. Cl. ........................... B05b 3/10
[50] Field of Search ........................... 239/223,
 77, 78, 152, 153

[56] References Cited
 UNITED STATES PATENTS
 2,607,573 8/1952 Hession .................. 239/223X
 2,686,990 8/1954 Matthews ............... 239/77X
 2,716,306 8/1955 Lear ........................ 239/77
 2,738,226 3/1956 Bals ........................ 239/77
 3,252,656 5/1966 Greenwood ............ 239/77
 FOREIGN PATENTS
 198,358 5/1922 Canada .................... 239/77

Primary Examiner—Lloyd L. King
Assistant Examiner—Thomas C. Culp, Jr.
Attorney—Karl W. Flocks ABSTRACT: A mist sprayer comprising a blower the outlet of which has a flat or an inverted pear-shaped cross section, a hollow rotary shaft provided near said outlet perpendicularly to the airstream discharged through said outlet, a spray tank communicating with said hollow rotary shaft, a pair of confronting shallow dishlike rotary discs mounted on said rotary shaft and defining a narrow gap between the opposed peripheral edges thereof, and a liquid distributing member disposed inside of said pair of rotary discs, said pair of rotary discs being rotated at a high speed whereby a mist is ejected into the airstream.

Patented Nov. 10, 1970
3,539,110
Sheet 1 of 2
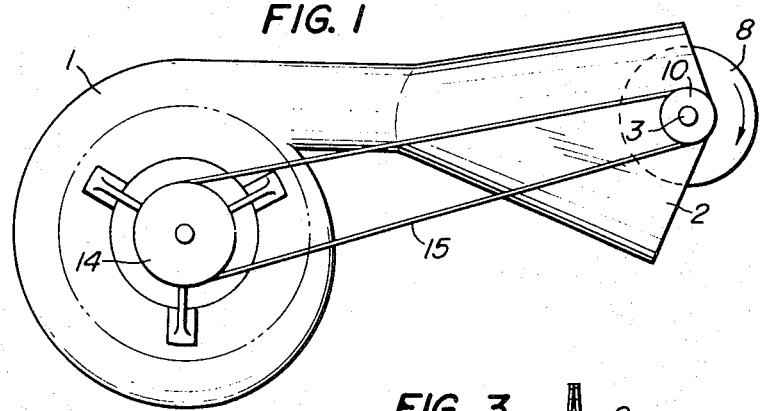
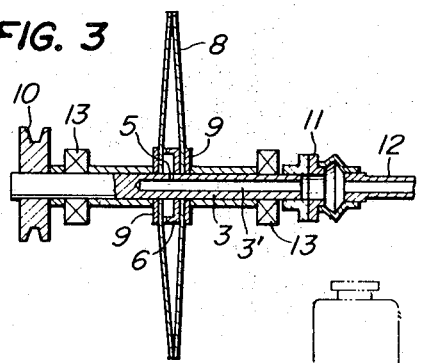
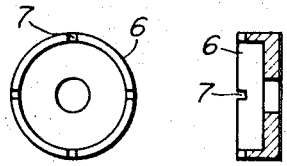
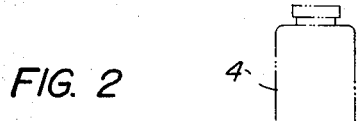
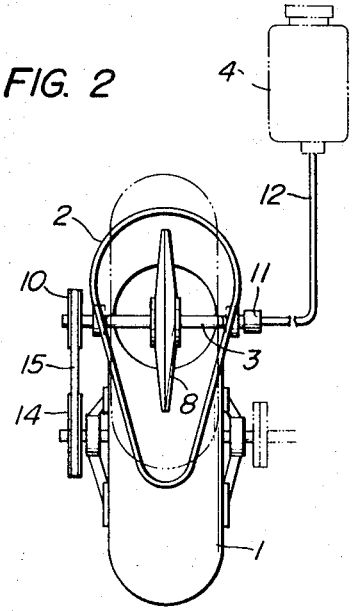
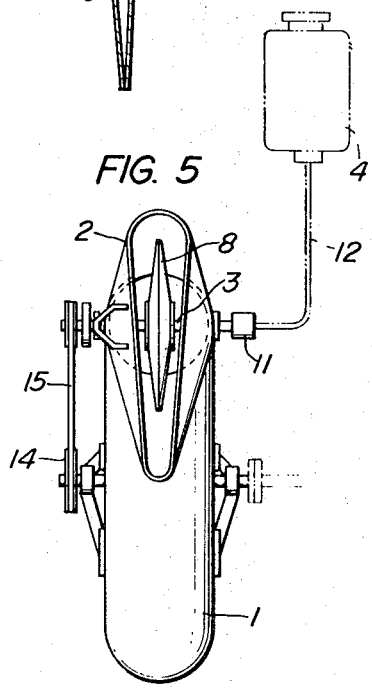
INVENTOR
Torao Kobayashi
BY Karen W. Flocks
ATTORNEY

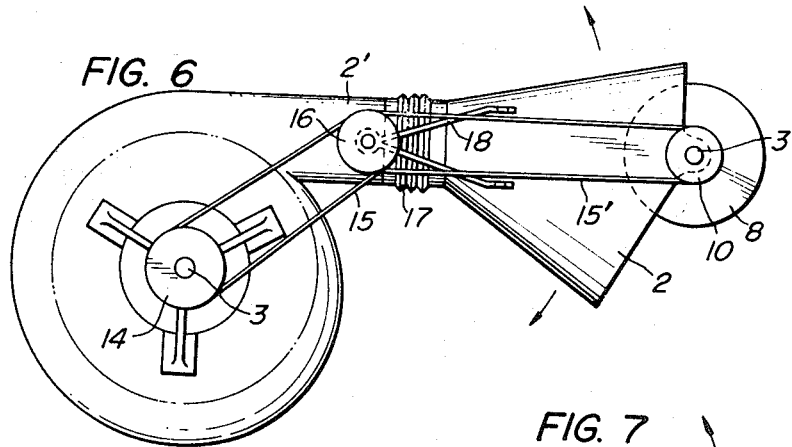
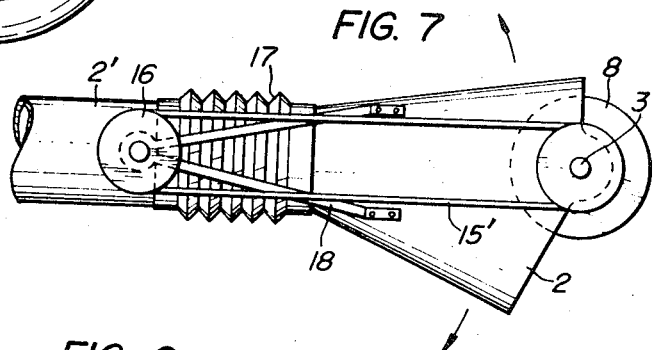
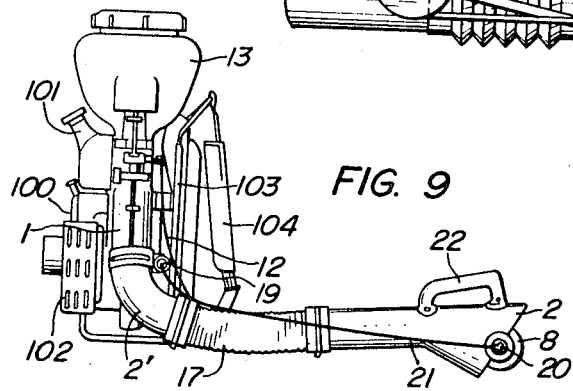
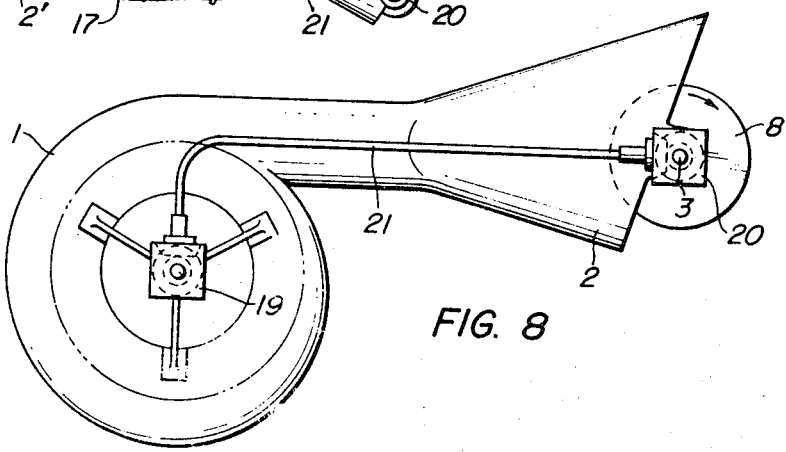

MIST SPRAYER

The present invention relates to an airblast-type mist sprayer.

As a conventional mist sprayer of this type, there has been known an apparatus which comprises a blower, a spray discharge nozzle disposed in the end portion of the discharge pipe of said blower in concentrical relation thereto and a deflector provided exterior of said discharge pipe in adjacent confronting relation thereto, whereby a spray liquid ejected through the nozzle with pressure is sprayed by said deflector. With such a conventional apparatus, there is the tendency that the particles of the sprayed liquid become large, and such tendency becomes more apparent when the amount of spray liquid supplied is smaller. Further, with the conventional apparatus, uniform spray cannot be obtained and accordingly it has been difficult to throttle the spray liquid. For the reasons set forth above, it has been necessary in use of the conventional apparatus to supply at least about 20 litres of liquid chemical per 10 ares. Therefore, the conventional apparatus has been highly unsuitable for use in such a place as, for example, a cotton farm, where sufficient water cannot be obtained.

The mist sprayer according to the present invention is so constructed as to be suitable for the spray of a very small amount of liquid chemical, which could not be attained by the conventional apparatus, and makes it possible to spray a very small amount of liquid chemical of the order of 50 to 100 cc. per 10 ares.

It is, therefore, an object of the present invention to provide a mist sprayer which is so constructed as to be suitable for the spray of a very small amount of liquid chemical.

It is another object of the present invention to provide a mist sprayer which is simple in structure and operative positively efficiently, and which is adapted for spraying an undiluted or high concentration diluted liquid chemical in the form of a mist screen of very fine particles in the range from a short distance to a long distance from the sprayer.

It is still another object of the present invention to provide a mist sprayer of the type described above, in which a spray head is made movable vertically as well as horizontally, so that the range of liquid chemical sprayed may be adjusted.

The features and advantages of the present invention will be evident from the following description when taken in conjunction with the accompanying drawings, in which:

FIG. 1 is a side elevation of a principal portion of an embodiment of the mist sprayer according to the present invention;

FIG. 2 is a front elevation of the mist sprayer shown in FIG. 1;

FIG. 3 is a cross section of rotary discs and parts associated therewith of the mist sprayer;

FIGS. 4A and 4B are a front elevation and a cross-sectional side view of a liquid distributing member respectively;

FIG. 5 is a front elevation of another embodiment of the mist sprayer of this invention which is similar to that shown in FIGS. 1 and 2 except that the cross-sectional shape of the spray head is slightly different from that of the latter;

FIG. 6 is a side elevation of a principal portion of the embodiment shown in FIG. 5;

FIG. 7 is a side elevation of the spray head of the mist sprayer shown in FIG. 6;

FIG. 8 is a side elevation of a principal portion of still another embodiment of the mist sprayer of this invention; and FIG. 9 is an overall perspective view of still another embodiment of the mist sprayer of this invention.

In the drawings showing the embodiments of this invention, similar parts are indicated by the same reference numerals.

Referring first to FIGS. 1 to 4, a spray head 2 which is formed integrally with the outlet of a power driven blower 1 has a flat cross section (as indicated by the chain line in FIG. 2) or an inverted pear-shaped cross section with the width thereof progressively reduced from the upper portion to the lower portion. A rotary shaft 3 is provided in the midportion of the spray head 2 perpendicularly to the air stream discharged through said spray head. The rotary shaft 3 is rotated at a high speed by operatively connecting it with the shaft of the blower by way of a belt as shown, or by separate driving means. Further, the rotary shaft 3 is provided therein with an axial hollow which is communicated with a spray tank 4 so that a liquid chemical in said tank may be supplied into said axial hollow. A cup-shaped liquid distributing member 6 having a plurality of notches 7 formed in the peripheral wall thereof is mounted on the rotary shaft 3 in such a manner that a liquid passage aperture 5 bored through the middle portion of the wall of said rotary shaft is located interior of said liquid distributing member. A pair of confronting shallow dish-shaped rotary discs 8 are mounted on the rotary shaft 3 with the liquid distributing member 6 interposed therebetween and pressed against said liquid distributing member by pressing rings 9 disposed outside of the respective discs. The rotary discs 8 define a narrow gap between the opposed peripheral edges thereof, through which the liquid chemical is ejected to the outside.

The rotary shaft 3 has a pulley 10 mounted at one end thereof and said pulley 10 is operatively connected with a pulley 14, mounted on the shaft of the blower, by means of a belt 15. The other end of the rotary shaft is connected through a mechanical seal 11 to a liquid supply tube 12 which is in communication with a spray tank 4. Reference numeral 13 designates a bearing.

In operation, when the blower is set in motion with a jet of airstream blown through the outlet thereof, the rotary shaft 3 is driven in the direction of the arrow. In this case, the liquid distributing member 6 acts as if the impeller of a pump and the liquid chemical introduced into said liquid distributing member through the liquid supply tube 12, the axial hollow 3' of the rotary shaft 3 and the liquid passage aperture 5 is discharged equally radially through the equally spaced notches 7 in the peripheral wall of said liquid distributing member and ejected to the outside through the narrow gap defined by the peripheral edges of the rotary discs in the form of a mist under the influence of centrifugal force. The mist of liquid chemical thus ejected is blown out through the outlet of the spray head by the airstream caused by the blower and jetting in parallel to the rotating rotary discs. In this case, the mist of liquid blown through the larger diameter portion of the inverted pear-shaped outlet of the spray head is sprayed over a longer distance since the jet of airstream blown through said portion is relatively high in velocity and large in amount, whereas that part of the mist blown through the smaller diameter portion of said outlet opening is sprayed over a shorter distance since the jet of airstream blown through said portion is relatively low in velocity and small in amount and further said portion of the outlet opening is open slantingly downwardly. Therefore, by performing the spraying operation while moving the spray head horizontally, a wide area can be sprayed efficiently. It is not particularly necessary to pressurize the liquid chemical because the liquid chemical is ejected under the centrifugal force created by the rotary discs. The mist sprayer described and illustrated above is suitable for spraying a small amount of liquid chemical as the particle size of the mist is very small. If the amount of liquid chemical sprayed is desired to be increased, a plurality of the apparatus described above may be used in side-by-side arrangement.

In the embodiment shown in FIGS. 5 and 6, the width of the outlet opening of the spray head 2 is smaller than that in the preceding embodiment and in this case the width of the resultant mist screen becomes narrower than that obtainable from the sprayer shown in FIG. 2 accordingly.

Further, according to this embodiment, the mist sprayer is so constructed that the spray head 2 is movable pivotally in the direction of the arrow. Namely, an intermediate shaft 16 is provided across the outlet 2' of the blower 1 and a flexible tube 17 is disposed between said outlet 2' and the spray head 2 having a flat or an inverted pear-shaped cross section. A bifurcated supporting member 18 is fitted to the spray head 2 at the ends of the two legs thereof, with the root thereof pivotally mounted on the intermediate shaft 16, so as to provide for a pivotal movement of the spray head about said intermediate shaft. The driving shaft of the blower 1, the intermediate shaft 16 and the hollow rotary shaft 3 are operatively connected with each other by means of belts 15 and 15' or other suitable means.

In operation, when the blower 1 is set in motion, the hollow shaft 3 is rotated at a high speed, so that the liquid chemical is ejected from the periphery of the rotary discs 8 under the influence of centrifugal force in the form of a mist. The mist thus formed is sprayed by being entrained in the jet of airstream as in the preceding embodiment. The mist sprayer of this embodiment is advantageous in that the spraying range can be adjusted by pivotally moving the spray head vertically.

In the embodiment shown in FIG. 8, a rotation transmitting cable is used as means for transmitting the drive of the blower to the rotary shaft 3. Namely, bevel gearings 19, 20 are provided on the driving shaft of the blower 1 and the hollow rotary shaft 3 respectively, instead of the respective pulleys shown in the preceding embodiments, and said bevel gearings are operatively connected with each other by a rotation transmitting cable 21.

In the embodiment shown in FIG. 9, a rotation transmitting cable 21 is used for transmitting the drive of the blower 1 to the hollow rotary shaft 3 and further a flexible tube 17 is disposed between the outlet opening 2' of the blower and the spray head 2 so as to provide for pivotal movement of the spray head in a vertical as well as a horizontal direction. With such construction, the liquid chemical can be sprayed in a wide range very efficiently and simply by manually manoeuvering the spray head by a handle 22. In the FIG., reference numeral 100 designates an engine, 101 a fuel tank, 102 a muffler, 103 a shoulder rack and 104 a shoulder strap.

I claim:

1. A shoulder mist sprayer comprising a blower, an engine for driving said blower and a liquid chemical tank assembled to be mounted on a shoulder rack, a flexible tube connected to said blower, a spray head connected to the outlet of said blower through said flexible tube, a hollow shaft rotatably mounted on the outlet end of said spray head positioned in the outlet opening thereof perpendicularly to the airstream blown from said blower through said spray head, said hollow shaft having therein a longitudinally extending passage for the liquid chemical in communication with the interior of said tank and having an aperture formed on the surface of said hollow shaft at an intermediate position thereof, a pair of confronting shallow dishlike rotary discs fixedly mounted on said hollow rotary shaft with a narrow gap defined between the peripheral edges thereof, a cup-shaped member for distributing the liquid chemical concentrically mounted on said hollow shaft and clamped between said rotary discs, said member having a radial wall portion and an axially extending peripheral wall portion which is provided with a plurality of notches formed on the outer edge thereof, said outer edge being in contact relation with the inner surface of one of said rotary discs to define a substantially closed space inside of said member in communication with said inside of the confronting rotary discs and said passage in the hollow shaft through said notches and said aperture respectively, and means for transmitting a part of the driving power of said engine to the hollow shaft and rotating said shaft, said distributing member and said rotary discs in union to thereby pump up the liquid chemical by said distributing member and eject it from the periphery of said rotary discs into the airstream in the form of a mist to be sprayed.

2. The shoulder mist sprayer as defined in claim 1, wherein said means for transmitting a part of the driving power of said engine is a flexible transmission cable connected between the rotating shaft of said blower and said hollow shaft.

3. The shoulder mist sprayer as defined in claim 1, wherein said means for transmitting a part of the driving power of said engine is belt means operatively connecting the rotating shaft of said blower and said hollow shaft through an intermediate shaft provided across the outlet of said blower, and said spray head is supported by a supporting member pivotally mounted on said intermediate shaft.